(12) United States Patent
Nakazawa et al.

(10) Patent No.: US 11,905,012 B2
(45) Date of Patent: Feb. 20, 2024

(54) DETERMINING METHOD OF ARRANGEMENT PLACE, TRANSPORT SYSTEM, AND INFORMATION PROCESSING DEVICE

(71) Applicant: Rakuten Group, Inc., Tokyo (JP)

(72) Inventors: Mitsuru Nakazawa, Tokyo (JP); Hiroaki Iwase, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 782 days.

(21) Appl. No.: 16/652,494

(22) PCT Filed: Dec. 25, 2018

(86) PCT No.: PCT/JP2018/047516
§ 371 (c)(1),
(2) Date: Mar. 31, 2020

(87) PCT Pub. No.: WO2020/136711
PCT Pub. Date: Jul. 2, 2020

(65) Prior Publication Data
US 2021/0221500 A1 Jul. 22, 2021

(51) Int. Cl.
*B64C 39/02* (2023.01)
*B64U 10/13* (2023.01)
*B64U 101/60* (2023.01)

(52) U.S. Cl.
CPC ........... *B64C 39/024* (2013.01); *B64U 10/13* (2023.01); *B64U 2101/60* (2023.01); *B64U 2201/10* (2023.01)

(58) Field of Classification Search
CPC ... B64C 13/20; B64C 39/024; B64C 2201/00; B64C 2201/027; B64C 2201/128; B64C 2201/141; B64D 1/02; B64D 1/08; B64D 9/00; B64D 47/08; B60W 60/00256; B60P 3/007; G05D 2201/0207; G05D 2201/0216; G01C 9/005; B64U 10/13; B64U 2101/60; B64U 2201/10
See application file for complete search history.

(56) References Cited

U.S. PATENT DOCUMENTS

| | | | |
|---|---|---|---|
| 9,701,408 B1* | 7/2017 | Willison | G08G 5/0034 |
| 11,132,005 B2* | 9/2021 | Kageyama | B64D 47/08 |
| 11,475,390 B2* | 10/2022 | Torii | G06Q 10/0832 |
| 11,488,089 B2* | 11/2022 | Chatani | G06Q 10/083 |
| 2010/0094952 A1* | 4/2010 | Lindgren | G06Q 10/06 709/227 |

(Continued)

FOREIGN PATENT DOCUMENTS

JP 2005-263112 A 9/2005

OTHER PUBLICATIONS

International Search Report for PCT/JP2018/047516 dated Apr. 2, 2019 [PCT/ISA/210].

*Primary Examiner* — Donald J Wallace
*Assistant Examiner* — Jalal C Coduroglu
(74) *Attorney, Agent, or Firm* — Sughrue Mion, PLLC

(57) ABSTRACT

A transport system identifies an attribute of a ground on the basis of sensing data obtained by sensing the ground in a transport destination area, which is performed in flight by an Unmanned Aerial Vehicle transporting an article, and determines a region in the ground as an arrangement place of the article on the basis of the identified attribute.

23 Claims, 10 Drawing Sheets

(56) References Cited

U.S. PATENT DOCUMENTS

| | | | |
|---|---|---|---|
| 2016/0047646 A1* | 2/2016 | Ochsendorf | G01B 11/28 |
| | | | 348/148 |
| 2018/0018619 A1* | 1/2018 | Kisiler | G06Q 10/083 |
| 2018/0089622 A1* | 3/2018 | Burch, V | B64U 50/19 |
| 2018/0222585 A1* | 8/2018 | Patrick | B64C 39/024 |
| 2019/0019141 A1* | 1/2019 | Torii | H04W 12/08 |
| 2019/0086532 A1* | 3/2019 | Ahmadian | B60L 53/126 |
| 2019/0102730 A1* | 4/2019 | Giorgi | H04L 67/12 |
| 2019/0278897 A1* | 9/2019 | Zhang | G06F 21/604 |
| 2019/0332998 A1* | 10/2019 | Ruxton | G08G 5/0069 |
| 2020/0207474 A1* | 7/2020 | Foggia | G05D 1/0676 |
| 2020/0294401 A1* | 9/2020 | Kerecsen | G05D 1/0287 |
| 2020/0379487 A1* | 12/2020 | Iwase | G08G 5/0078 |

\* cited by examiner

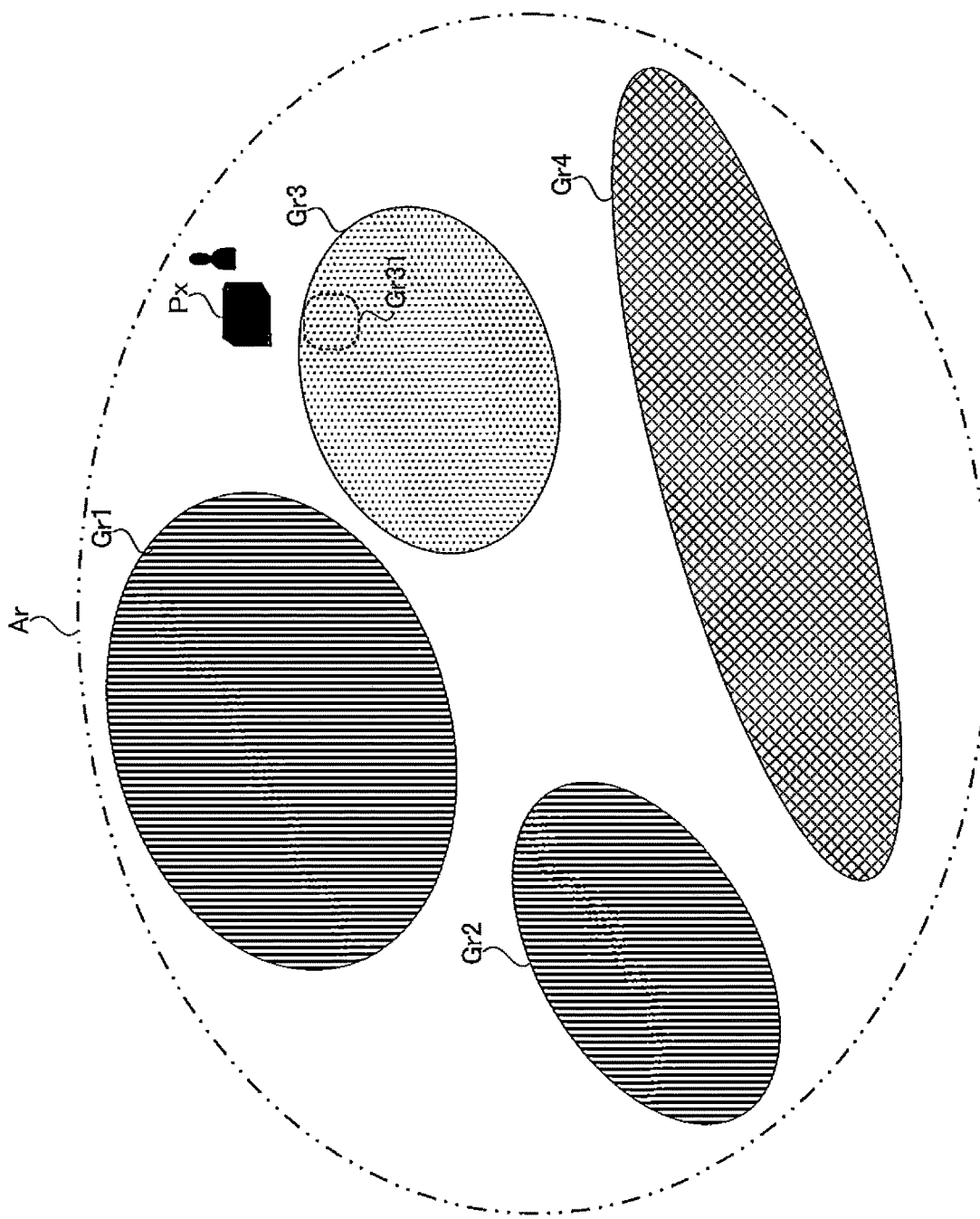

FIG. 6

ARRANGEMENT PROPRIETY TABLE

| NO. | TYPE OF ARTICLE | | ATTRIBUTE OF GROUND | | | | | | | | | |
|---|---|---|---|---|---|---|---|---|---|---|---|---|
| | BASIC INFORMATION | ACCOMPANYING INFORMATION | CONCRETE | SOIL | LAWN | SAND | HORIZONTAL | UNEVEN | TILT | HARD | SOFT | PUDDLE | WET | DRY | ... |
| 1 | CLOTHES | - | FIT | FIT | FIT | FIT | FIT | FIT | FIT | FIT | FIT | UNFIT | UNFIT | FIT | ... |
| 2 | MEDICINE | - | FIT | FIT | FIT | FIT | FIT | FIT | FIT | FIT | FIT | UNFIT | UNFIT | FIT | ... |
| 3 | MEDICINE | HEAT CAUTION | UNFIT | FIT | FIT | FIT | FIT | FIT | FIT | FIT | FIT | UNFIT | UNFIT | FIT | ... |
| 4 | BOOK | - | FIT | FIT | UNFIT | FIT | FIT | FIT | FIT | FIT | FIT | UNFIT | UNFIT | FIT | ... |
| 5 | FOOD | - | FIT | FIT | FIT | FIT | FIT | FIT | FIT | FIT | FIT | UNFIT | FIT | FIT | ... |
| 6 | FOOD | HEAT CAUTION | UNFIT | FIT | FIT | FIT | FIT | FIT | FIT | FIT | FIT | UNFIT | FIT | FIT | ... |
| 7 | FOOD | FRAGILE ITEM | UNFIT | FIT | FIT | FIT | FIT | FIT | FIT | UNFIT | FIT | UNFIT | FIT | FIT | ... |
| 8 | FOOD | THIS SIDE UP | FIT | FIT | FIT | FIT | FIT | UNFIT | UNFIT | FIT | FIT | UNFIT | FIT | FIT | ... |
| 9 | DRINK | - | FIT | FIT | FIT | FIT | FIT | FIT | FIT | UNFIT | FIT | UNFIT | FIT | FIT | ... |
| 10 | DRINK | FRAGILE ITEM | UNFIT | FIT | FIT | FIT | FIT | FIT | FIT | UNFIT | FIT | UNFIT | FIT | FIT | ... |
| 11 | DAILY NECESSITY | - | FIT | FIT | FIT | FIT | FIT | FIT | FIT | FIT | FIT | UNFIT | UNFIT | FIT | ... |
| 12 | FIRST AID PRODUCT | - | FIT | FIT | FIT | FIT | FIT | FIT | FIT | FIT | FIT | UNFIT | UNFIT | FIT | ... |
| 13 | ELECTRICAL APPLIANCE | - | UNFIT | FIT | FIT | UNFIT | FIT | FIT | FIT | UNFIT | FIT | UNFIT | UNFIT | FIT | ... |
| ... | ... | ... | ... | ... | ... | ... | ... | ... | ... | ... | ... | ... | ... | ... | ... |

FIG. 7

ARRANGEMENT APPROPRIATENESS TABLE    APPROPRIATENESS : A>B>C

| NO. | TYPE OF ARTICLE | | ATTRIBUTE OF GROUND | | | | | | | | | | |
|---|---|---|---|---|---|---|---|---|---|---|---|---|---|
| | BASIC INFORMATION | ACCOMPANYING INFORMATION | CONCRETE | SOIL | LAWN | SAND | HORIZONTAL | UNEVEN | TILT | HARD | SOFT | PUDDLE | WET | DRY | ... |
| 1 | CLOTHES | — | A | B | B | B | A | B | B | A | B | C | C | A | ... |
| 2 | MEDICINE | — | A | B | B | B | A | B | B | A | B | C | C | A | ... |
| 3 | MEDICINE | HEAT CAUTION | C | A | B | B | A | B | B | A | B | C | C | A | ... |
| 4 | BOOK | — | A | B | C | B | A | B | B | A | B | C | C | A | ... |
| 5 | FOOD | — | A | A | B | B | A | B | B | A | B | C | B | A | ... |
| 6 | FOOD | HEAT CAUTION | C | B | A | A | A | B | B | A | B | C | B | A | ... |
| 7 | FOOD | FRAGILE ITEM | C | B | A | A | A | B | B | C | B | C | B | A | ... |
| 8 | FOOD | THIS SIDE UP | A | B | B | B | A | B | C | A | B | C | B | A | ... |
| 9 | DRINK | — | A | B | B | B | A | B | B | A | B | C | B | A | ... |
| 10 | DRINK | FRAGILE ITEM | C | B | B | B | A | B | B | C | B | C | B | A | ... |
| 11 | DAILY NECESSITY | — | A | B | B | B | A | B | B | A | B | C | C | A | ... |
| 12 | FIRST AID PRODUCT | — | A | B | B | B | A | B | B | A | B | C | C | A | ... |
| 13 | ELECTRICAL APPLIANCE | — | C | A | B | C | A | B | B | C | B | C | C | A | ... |
| ... | ... | | ... | ... | ... | ... | ... | ... | ... | ... | ... | ... | ... | ... | ... |

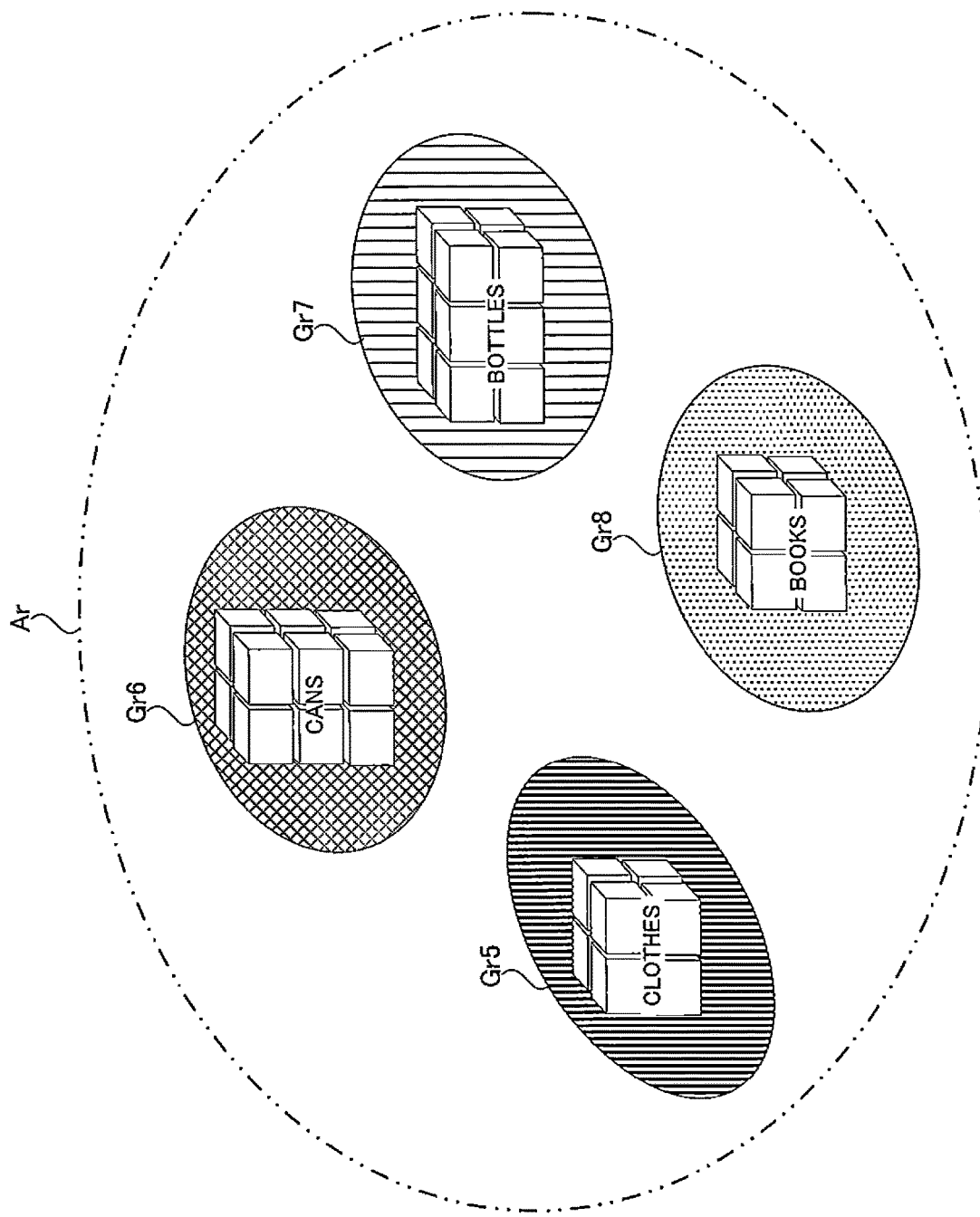

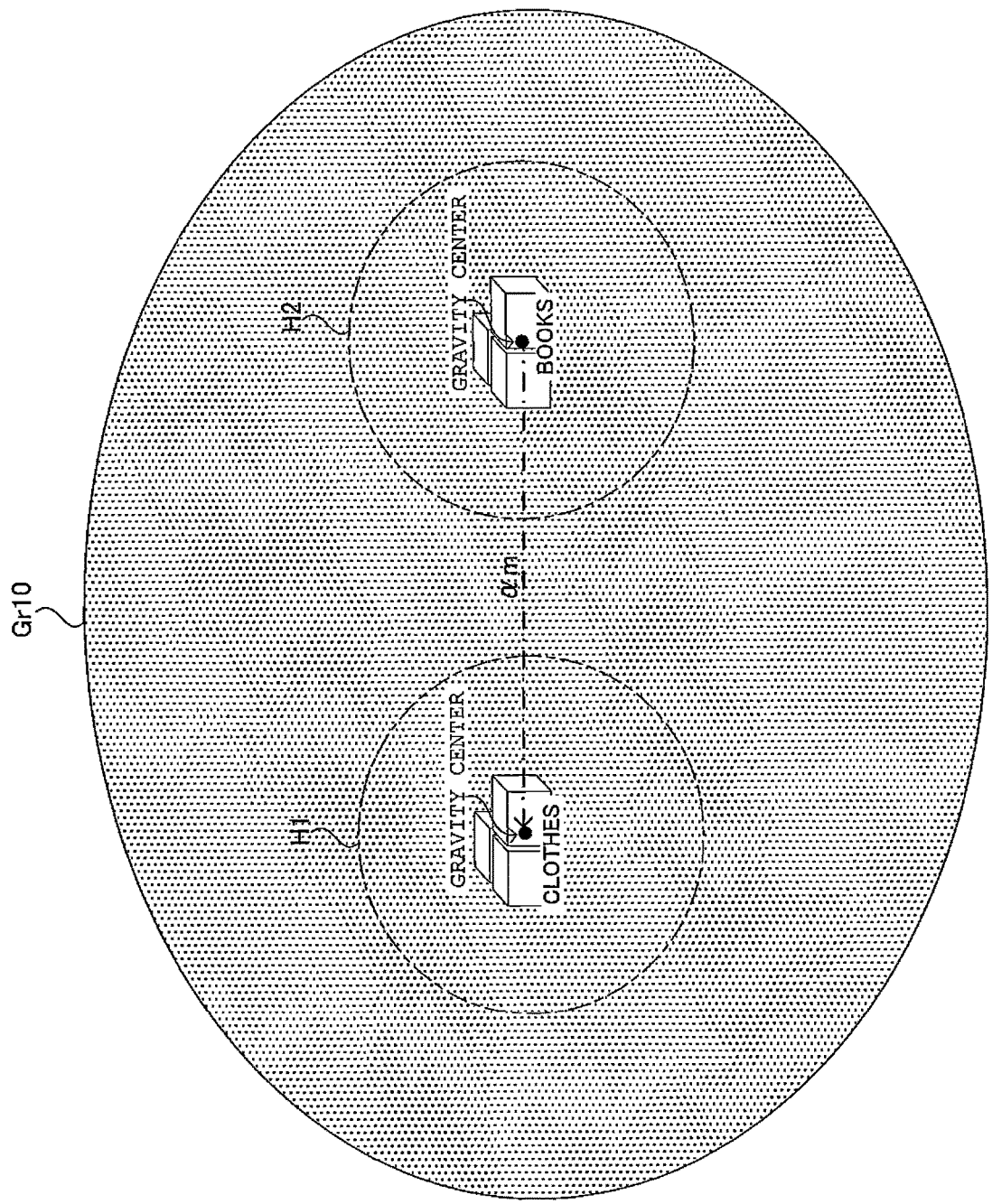

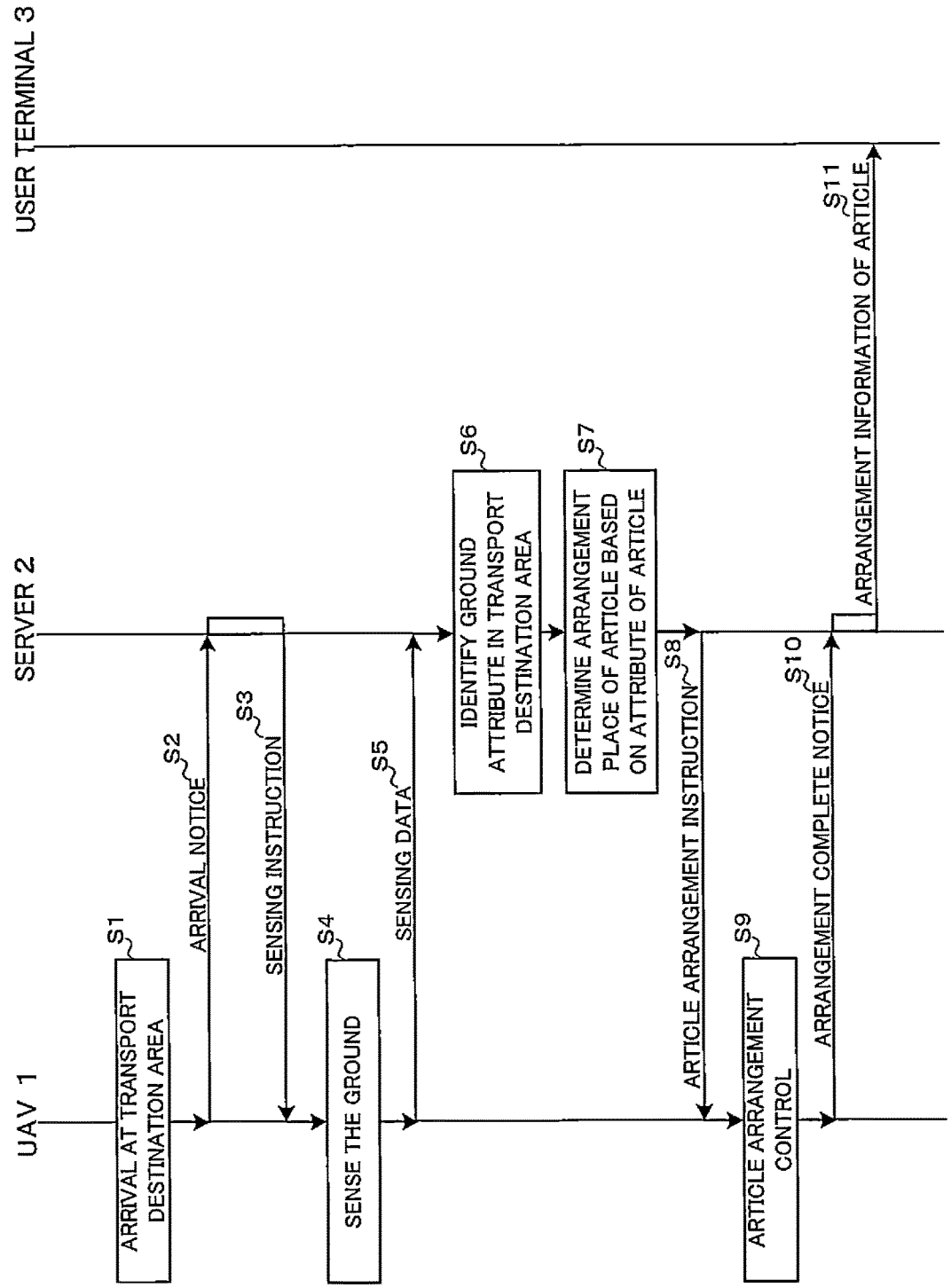

DETERMINING METHOD OF ARRANGEMENT PLACE, TRANSPORT SYSTEM, AND INFORMATION PROCESSING DEVICE

CROSS REFERENCE TO RELATED APPLICATIONS

This application is a National Stage of International Application No. PCT/JP2018/047516 filed Dec. 25, 2018.

TECHNICAL FIELD

The present invention relates to a technical field such as a transport system which includes an unmanned aerial vehicle that transports an article into a transport destination area.

BACKGROUND ART

In recent years, transportation using unmanned aerial vehicles has been studied. For example, JP 2005-263112A, discloses a technique for transporting an article to a transport destination by controlling the flight of an unmanned aerial vehicle (unmanned aircraft) containing the article (cargo). In this technique, delivery of an article at a transport destination is performed by lowering a storage case of the article by a lifting means of the unmanned aerial vehicle or by dropping the article from the unmanned aerial vehicle.

CITATION LIST

Patent Literature

Patent Literature 1: JP 2005-263112 A

SUMMARY OF INVENTION

Technical Problem

However, the ground where the article transported by the unmanned aerial vehicle is arranged is not always put in order. Therefore, it may be difficult to arrange the article appropriately depending on the attribute of the ground where the article is arranged. Moreover, even in a case where the ground where the article is arranged is put in order, it may be difficult to properly arrange the article due to the influence of the outdoor environment or the like.

Therefore, one or more embodiments of the present invention are directed to provide a determining method of an arrangement place, a transport system, and an information processing device that enable an article to be transported by the unmanned aerial vehicle to be arranged at a more appropriate arrangement place.

Solution to Problem

In response to the above issue, the invention according to claim 1 is a determining method performed by a transport system including an unmanned aerial vehicle for transporting an article into a predetermined transport destination area. The determining method includes: an identifying step of identifying an attribute of a ground on the basis of sensing data obtained by sensing the ground in the transport destination area which is performed in flight by the unmanned aerial vehicle that transports the article or an unmanned aerial vehicle other than the unmanned aerial vehicle; and a determining step of determining all or part of a region in the ground as an arrangement place of the article on the basis of the attribute of the ground. This makes it possible to arrange the article to be transported by the unmanned aerial vehicle at more appropriate arrangement place.

The invention according to claim 2 is the determining method according to claim 1, wherein the attribute of the ground is identified by classifying the ground into any one of a plurality of attributes on the basis of the sensing data. This makes it possible to arrange the article to be transported by the unmanned aerial vehicle at more appropriate arrangement place.

The invention according to claim 3 is the determining method according to claim 1 or 2, wherein all or part of a region in the ground having an appropriate attribute for arranging the article is determined as an arrangement place of the article on the basis of the attribute of the ground. This makes it possible to arrange the article to be transported by the unmanned aerial vehicle at more appropriate arrangement place.

The invention according to claim 4 is the determining method according to any one of claims 1 to 3 further including: an acquisition step of acquiring type information indicating a type of the article, wherein, in the determining step, all or part of a region in the ground having an appropriate attribute according to the type of article is determined as an arrangement place of the article on the basis of the attribute of the ground and the acquired type information. This makes it possible to arrange the article to be transported by the unmanned aerial vehicle at a more appropriate arrangement place according to the type of article.

The invention according to claim 5 is the determining method according to claim 4 further including: a step of receiving accompanying information of the article from a terminal of a transport requester or a recipient of the article, wherein the type information including the accompanying information is acquired as a part of the type of article. This makes it possible to arrange the article to be transported by the unmanned aerial vehicle at an appropriate arrangement place according to the intention of the transport requester or the recipient of the article.

The invention according to claim 6 is the determining method according to claim 4 or 5, wherein a table that indicates a relation between the type of article and the attribute of the ground by a propriety or appropriateness of arrangement of the article is used to determine all or part of a region in the ground having an appropriate attribute according to the type of article as an arrangement place of the article. This makes it possible to determine the arrangement place of the article to be transported by the unmanned aerial vehicle more quickly.

The invention according to claim 7 is the determining method according to claim 6 further including: a step of updating the propriety or appropriateness of arrangement of the article on the basis of information obtained from an arrangement result of the article. This makes it possible to optimize the table that shows the relation between the type of article and the attribute of the ground by propriety or appropriateness of arrangement of the article.

The invention according to claim 8 is the determining method according to any one of claims 1 to 7, wherein part of a region near a specific point in the ground having an appropriate attribute for arranging the article is determined as an arrangement place of the article on the basis of the attribute of the ground. This makes it possible to shorten the time for a person who needs the article which is transported by the unmanned aerial vehicle to move from the specific point to the arrangement place where the article is arranged. Thus, it is possible to provide the article to the person more quickly.

The invention according to claim 9 is the determining method according to any one of claims 1 to 8 further including: a step of acquiring weight information indicating a weight of the article, wherein part of a region nearer a specific point as the weight of the article is increased, in the ground having an appropriate attribute for arranging the article, is determined as an arrangement place of the article on the basis of the attribute of the ground and the acquired weight information. This makes it possible to reduce a burden of the person who needs the article which is transported by the unmanned aerial vehicle to be transported from the arrangement place to the specific point.

The invention according to claim 10 is the determining method according to any one of claims 1 to 9 further including: a step of acquiring priority information indicating a priority of the article, wherein part of a region nearer a specific point as a priority of the article is increased, in the ground having an appropriate attribute for arranging the article, is determined as an arrangement place of the article on the basis of the attribute of the ground and the acquired priority information. This makes it possible to provide the article having a high priority more quickly to the person who needs the article to be transported by the unmanned aerial vehicle.

The invention according to claim 11 is the determining method according to any one of claims 1 to 10, wherein a process for optimizing an arrangement of a plurality of articles to be transported into the transport destination area is performed in order to meet an arrangement criterion for arrangement of the plurality of articles on the basis of the attribute of the ground so as to determine each of arrangement places of the article. This makes it possible to arrange the plurality of articles more appropriately to the arrangement place according to the arrangement criterion for the plurality of articles to be transported by the unmanned aerial vehicle.

The invention according to claim 12 is the determining method according to claim 11, wherein the arrangement criterion is a criterion for arranging more articles on the ground having an appropriate attribute. This makes it possible to optimize the arrangement of the plurality of articles so that as many articles as possible are arranged.

The invention according to claim 13 is the determining method according to claim 11, wherein the arrangement criterion is a criterion for arranging an article having a higher priority on the ground having an appropriate attribute. This makes it possible to optimize the arrangement of the plurality of articles so that the article having a high priority is arranged.

The invention according to claim 14 is the determining method according to claim 11, wherein the arrangement criterion is a criterion for arranging a plurality of articles of the same type densely on the ground having an appropriate attribute. This makes it possible to optimize the arrangement of the plurality of articles so that the plurality of articles of the same type is arranged as close together as possible.

The invention according to claim 15 is the determining method according to claim 11, wherein the arrangement criterion is a criterion for densely gathering the plurality of articles of a first type, densely gathering the plurality of articles of a second type different from those of the first type, and arranging the plurality of articles in the ground having an appropriate attribute while separating a predetermined distance or more between one point in a range where the plurality of articles of the first type are densely gathered and one point in a range where the plurality of articles of the second type are densely gathered. This makes it possible to optimize the arrangement of the plurality of articles so that a region where the plurality of articles is arranged as close as possible to each type can be easily expanded later.

The invention according to claim 16 is the determining method according to claim 11, wherein the arrangement criterion is a criterion for arranging the plurality of articles in a wider range of ground as a planned arrangement number of the articles is large in the ground that has an appropriate attribute and are divided into a plurality of sections. This makes it possible to optimize the arrangement of the plurality of articles so that the plurality of articles is arranged as much as possible on the ground having a size corresponding to the planned arrangement number.

The invention according to claim 17 is the determining method according to any one of claims 1 to 16 further including: a notification step of notifying a transport requester or a recipient of the article of arrangement information of the article arranged at the determined arrangement place. This makes it possible to accurately convey the arrangement place of the article to the transport requester or the recipient of the article.

The invention according to claim 18 is the determining method according to claim 17, wherein, after a predetermined time has elapsed since the arrangement information is sent as a notification to the transport requester or the recipient, the arrangement information which is updated on the basis of an arrangement status of the article captured from above the transport destination area by an unmanned aerial vehicle that transports the article into the transport destination area or an unmanned aerial vehicle different from the unmanned aerial vehicle is sent as a notification to the transport requester or the recipient. According to this configuration, the arrangement information provided to the transport requester or the recipient can be made more accurate and realistic.

The invention according to claim 19 is the determining method according to any one of claims 1 to 18, wherein, after the arrangement place is determined, the attribute of the ground is re-identified on the basis of sensing data obtained by re-sensing the ground in the transport destination area, and all or part of a region in the ground is re-determined as the arrangement place of the article on the basis of the re-identified attribute of the ground. According to this configuration, even in a case where the time has elapsed from the time point of the first sensing and the ground state, situation, or the like has changed, the article to be transported by the unmanned aerial vehicle later can be arranged more appropriately.

The invention according to claim 20 is the determining method according to any one of claims 1 to 19 further including: a step of performing flight control of an unmanned aerial vehicle that transports the article according to the determined arrangement place. According to this configuration, it is possible to cause the unmanned aerial vehicle that transports the article to quickly fly to the arrangement place.

The invention according to claim 21 is the determining method according to any one of claims 1 to 20, wherein an unmanned aerial vehicle that transports the article into the transport destination area performs sensing the ground in the transport destination area. This makes it possible to arrange the article to be transported by the unmanned aerial vehicle at the arrangement place more efficiently.

The invention according to claim 22 is a transport system including an unmanned aerial vehicle that transports an article into a predetermined transport destination area. The transport system includes: an identifying unit which identifies an attribute of a ground on the basis of sensing data obtained by sensing the ground in the transport destination area which is performed in flight by the unmanned aerial vehicle that transports the article or an unmanned aerial vehicle other than the unmanned aerial vehicle; and a determining unit which determines all or part of a region in the ground on the basis of the attribute of the ground as an arrangement place of the article.

The invention according to claim 23 is an information processing device provided in a transport system including an unmanned aerial vehicle that transports an article into a predetermined transport destination area. The information processing device includes: an identifying unit which identifies an attribute of a ground on the basis of sensing data obtained by sensing the ground in the transport destination area which is performed in flight by the unmanned aerial vehicle that transports the article or an unmanned aerial vehicle other than the unmanned aerial vehicle; and a determining unit which determines all or part of a region in the ground on the basis of the attribute of the ground as an arrangement place of the article.

Advantageous Effect of the Invention

According to one or more embodiments of the present invention, it is possible to arrange the article to be transported by the unmanned aerial vehicle at more appropriate arrangement place.

BRIEF DESCRIPTION OF THE DRAWINGS

FIG. 5 is a conceptual diagram illustrating a result of identifying attributes of the ground in a transport destination area.

FIG. 6 is a diagram illustrating an example of a arrangement propriety table.

FIG. 7 is a diagram illustrating an example of a arrangement appropriateness table.

FIG. 8 is a conceptual diagram illustrating a state in which a plurality of articles are arranged so as to meet a criterion for arranging the plurality of articles of a same type densely on the ground having appropriate attributes.

FIG. 9 is a conceptual diagram illustrating a state in which a plurality of articles are arranged so as to meet a criterion for arranging the plurality of articles of a first type and the plurality of articles of a second type separately on the ground having an appropriate attribute.

FIG. 10 is a sequence diagram illustrating an example of an operation of a transport system S after an UAV 1 arrives at a transport destination area.

DESCRIPTION OF EMBODIMENTS

Hereinafter, a transport system according to an embodiment of the present invention and a determining method of an arrangement place executed by the transport system will be described with reference to the drawings.

[1. Outline of Configuration of Transport System S and Determining Method of Arrangement Place]

Figure 1:
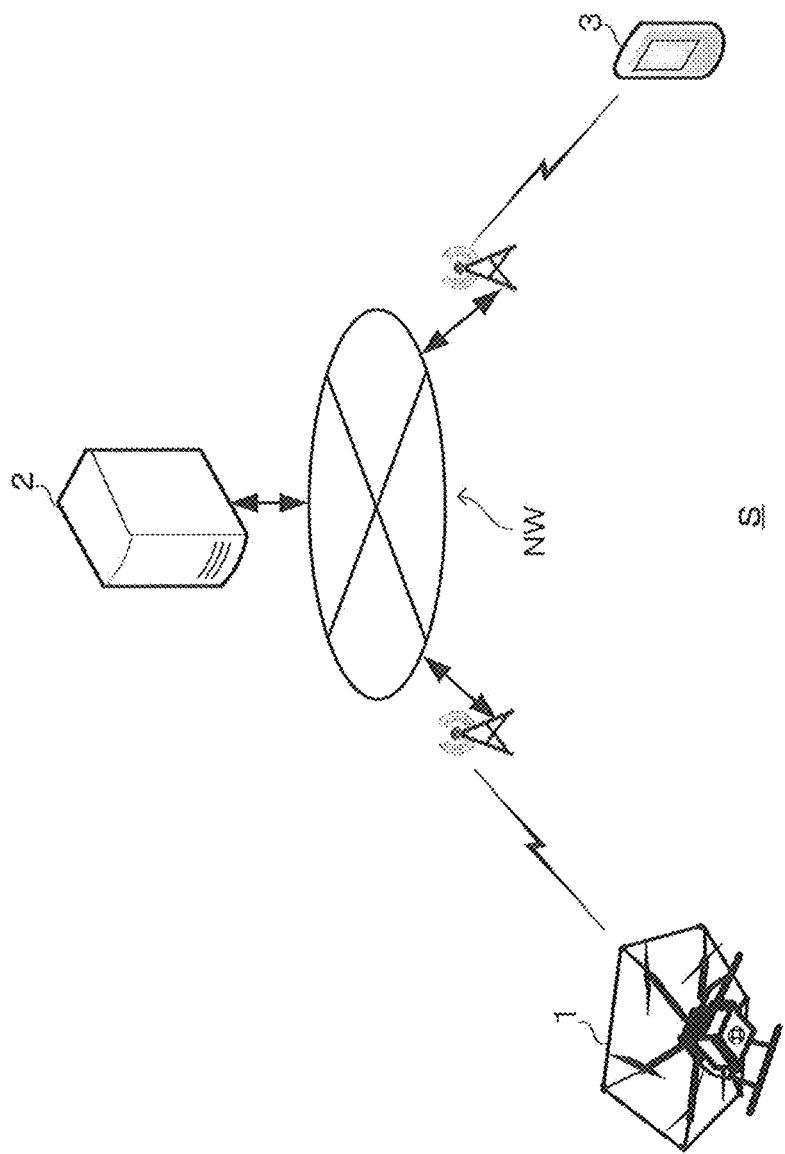
FIG. 1 is a diagram illustrating a schematic configuration example of a transport system S.

First, the configuration of a transport system S according to this embodiment and the outline of the determining method of the arrangement place will be described with reference to FIG. 1. FIG. 1 is a diagram illustrating a schematic configuration example of the transport system S. As illustrated in FIG. 1, the transport system S includes an unmanned aerial vehicle (hereinafter, referred to as "UAV (Unmanned Aerial Vehicle)") 1 that flies in the atmosphere (in the air), a server 2 that manages information about articles, and a user terminal 3. The UAV 1 can communicate with the server 2 via a communication network NW. Moreover, the server 2 can communicate with the user terminal 3 via the communication network NW. The user terminal 3 is, for example, a personal computer, a smartphone, a mobile phone, or the like used by a transport requester, a recipient, or the like of the article (including an agent for transporting the article). The communication network NW includes, for example, the Internet, a mobile communication network, a radio base station thereof, and the like. Radio communication is performed between the radio base station and the UAV 1.

The UAV 1 is used for transporting an article into a predetermined transport destination area and placing the article at the arrangement place determined in the transport destination area. Herein, the transport destination area is an area having a certain size outside, but is not particularly limited. The transport destination area includes, for example, an area including a refuge in an emergency such as a disaster in addition to a park, a schoolyard, a vacant land, and the like. Moreover, the article to be arranged may be any goods (for example, purchased goods, delivery goods, evacuation goods, relief goods, etc.) as long as they are cargos which can be transported by the UAV 1. Moreover, in some cases, a plurality of articles is packed together (for example, a plurality of articles is stored in one box) to form one article. Incidentally, the UAV 1 illustrated in FIG. 1 is also called a drone or a multicopter. In the example of FIG. 1, one UAV 1 is illustrated, but the transport system S may include a plurality of UAVs 1. The server 2 is an example of an information processing device. In the example of FIG. 1, it is assumed that the server 2 is fixedly installed independently of the UAV 1, but all or part of the functions of the server 2 may be provided in the UAV 1. In this case, all or part of the processing (each step in the determining method of the arrangement place) performed by the server 2 is performed by the UAV 1. Alternatively, all or part of the processing performed by the server 2 may be performed by the user terminal 3.

The determining method of the arrangement place executed by the transport system S includes an identifying step and a determining step. In the identifying step, the attribute of the ground is identified on the basis of sensing data obtained by sensing the ground in the transport destination area (sensing with respect to the ground), which is sensing performed by the UAV 1 in flight. Herein, the sensing of the ground refers to measuring (observing) the ground (objects existing in contact with the ground or the like may exist) with the UAV 1 as the viewpoint. For example, the UAV 1 flies autonomously or flies by remote control up to the sky above the transport destination area, and performs sensing the ground from the sky above the transport destination area. The ground is not always flat but may have irregularities. It is efficient if the sensing of the ground is performed by the UAV 1 that transports an article into the transport destination area (that is, the UAV 1 for transportation), but the sensing of the ground may be performed by the UAV 1 for sensing other than the UAV 1 for transportation. Moreover, the sensing of the ground may be performed by any one UAV 1 among the plurality of UAVs 1 each transporting an article into the transport destination area. Incidentally, the sensing data obtained by sensing the ground may be image data obtained by capturing with a camera, or various types of data obtained by various types of sensors provided in the UAV 1 such as an infrared sensor, a thermal sensor, an ultrasonic sensor, a photoelectric sensor, a laser sensor, or a LiDAR.

The attribute of the ground can be identified on the basis of such sensing data. For example, the ground attribute is identified by classifying the sensed ground into any one or more attributes such as concrete, soil, lawn, and sand. Herein, the attributes of concrete, soil, lawn, sand, and the like can be said as the type of the ground, but other examples of the attributes of the ground include the hardness, shape, state, and the like of the ground. The hardness of the ground can be classified into any attribute such as hard and soft. The shape of the ground (that is, terrain) can be classified into any one of attributes such as horizontal, uneven, gradient, and inclination (tilt). The state of the ground can be classified into any of the attributes such as a puddle (the puddle is present), a deposit is present, wet and dry. However, the attribute of the ground may be identified without being classified into any of the plurality of attributes. For example, the hardness level (that is, the level indicating how hard) may be identified without classifying the hardness of the ground as either hard or soft. Moreover, the attribute of the ground may be expressed in a plurality of dimensions. For example, depending on a combination of type, shape, hardness, state, etc., the attribute may be expressed by two dimensions (for example, type and shape), three dimensions (for example, type, shape, and hardness), or four dimensions (for example, type, shape, hardness, and state). Incidentally, well-known techniques such as image recognition, SLAM (Simultaneous Localization and Mapping), machine learning, and the like can be used as a method for identifying the attribute of the ground on the basis of the sensing data.

Then, in the determining step, all or part of the region of the ground is determined as the arrangement place of the articles to be transported by the UAV 1 on the basis of the ground attribute identified in the identifying step. For example, all or part of the region of the ground having the appropriate attribute for arranging the article on the basis of the attribute of the ground is determined as the arrangement place of the article. Herein, an appropriate attribute for arranging an article means, for example, an attribute which does not damage the article when the article is arranged on the ground, or an attribute which causes an extremely less damages on the article. For example, a ground without a puddle can be said to be a ground having an appropriate attribute for arranging the article (general articles) than a ground with a puddle. Incidentally, in the case of transporting an article at a logistics facility such as a warehouse, a place where the article is to be arranged is set in advance, or the ground and floor are put in order. On the other hand, for example, it is assumed that the article has not been delivered by the UAV 1 until now in the outdoor transport destination area in an emergency or the like. As in the case of the logistics facility described above, information of the place where the logistics facility is set in advance is not possible to be used as the example of the logistics facility described above, and the ground is not always put in order. According to the determining method executed by the transport system S, the UAV 1 can appropriately arrange the article in the transport destination area.

By the way, whether the attribute is appropriate may change depending on the type of article. For example, in the case of an article that is vulnerable to shock or vibration, the sand or soil ground can be said to have a more appropriate attribute for arranging the article than the concrete ground. For example, sand ground has the least impact on an article. On the other hand, in the case of an article in which dirt, deposits, or the like are not preferable, the concrete ground can be said to have a more appropriate attribute for arranging the article than the sand or soil ground. Moreover, in the case of an article that causes problems due to sand entering, it can be said that the concrete ground has a more appropriate attribute for arranging the article than the sand ground. Moreover, in the case of an article that is weak against heat, the lawn or soil ground can be said to have a more appropriate attribute for arranging the article than the sand or concrete ground. In particular, the concrete ground can be hot when exposed to sunlight. As described above, in the determining step, it is desirable to determine the ground having an appropriate attribute according to the type of article as the arrangement place of the article.

[1-1. Outline of Configuration and Function of UAV 1]

Figure 2:
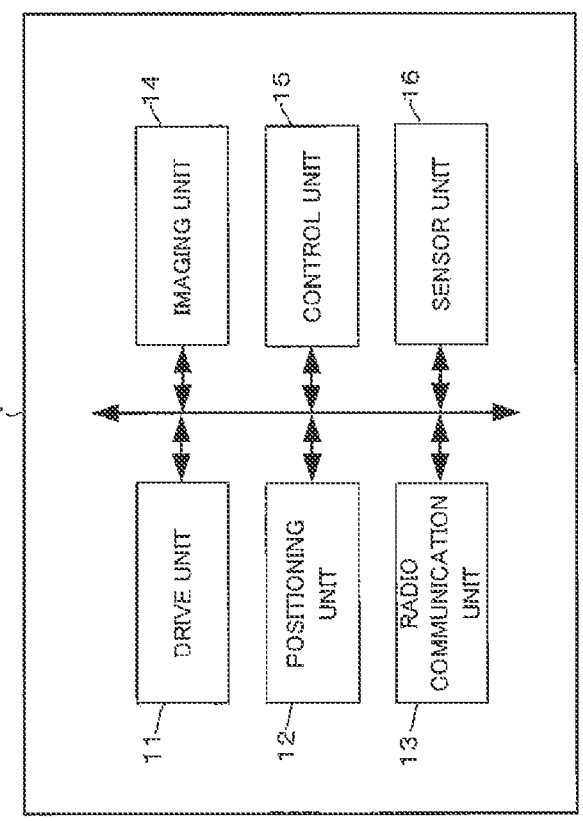
FIG. 2 is a diagram illustrating a schematic configuration example of an UAV 1.

Next, the outline of the configuration and function of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a radio communication unit 13, an imaging unit 14, a control unit 15, a sensor 16 and the like. Incidentally, while not illustrated, the UAV 1 includes a rotor (propeller) that is a horizontal rotary blade, various sensors, an article holding mechanism, and a battery or the like that supplies power to each part of the UAV 1. Various sensors 16 used for flight control of the UAV 1 include a barometric sensor, a three-axis acceleration sensor, a geomagnetic sensor, and the like. Detection information detected by the various sensors 16 is output to the control unit 15.

The drive unit 11 includes a motor, a rotating shaft, and the like. The drive unit 11 rotates a plurality of rotors by a motor, a rotating shaft, and the like that are driven according to a control signal output from the control unit 15. The positioning unit 12 includes a radio receiver, an altitude sensor, and the like. For example, the positioning unit 12 receives a radio wave transmitted from a GNSS (Global Navigation Satellite System) satellite by the radio receiver, and detects the current position (latitude and longitude) of the UAV 1 in the horizontal direction on the basis of the radio wave. The current position of the UAV 1 is the flight position of the UAV 1 in flight. Incidentally, the current position in the horizontal direction of the UAV 1 may be corrected on the basis of image data captured by the imaging unit 14 or radio waves transmitted from the radio base station. Further, the positioning unit 12 may detect the current position (altitude) in the vertical direction of the UAV 1 using the altitude sensor. Position information indicating the current position detected by the positioning unit 12 is output to the control unit 15.

The radio communication unit 13 controls communication performed via the communication network NW. The imaging unit 14 includes a camera (2D or 3D camera) or the like. In addition to the flight control of the UAV 1, the camera is used as a sensor for sensing the ground. The imaging unit 14 continuously captures a real space within a range that falls within the angle of view of the camera. The image data captured by the imaging unit 14 is output to the control unit 15. Incidentally, for sensing the ground, the UAV 1 may use at least one the sensor 16 (sensor device) such as an infrared sensor, a thermal sensor, an ultrasonic sensor, a photoelectric sensor, a laser sensor, or a LiDAR. Further, the UAV 1 may be provided with an impact sensor or the like for sensing an impact when the article is arranged at the arrangement place.

The control unit 15 includes a central processing unit (CPU) which is a processor, a read only memory (ROM), a random access memory (RAM), a non-volatile memory, and the like. The control unit 15 performs sensing of the ground in the transport destination area during the flight of the UAV 1 using the camera or the like of the imaging unit 14 according to a sensing program (program code group) stored in, for example, the ROM or the non-volatile memory. The control unit 15 transmits the sensing data obtained by sensing the ground to the server 2 together with the aircraft ID of the UAV 1 through the radio communication unit 13, for example, at predetermined time intervals. The aircraft ID is identification information for identifying the UAV 1. The sensing data to be transmitted may be the image data captured by the imaging unit 14, or may be various types of data obtained by sensing of at least one of an infrared sensor, a thermal sensor, an ultrasonic sensor, a photoelectric sensor, a laser sensor, a LiDAR, and the like. Incidentally, during the flight of the UAV 1, the control unit 15 may periodically transmit the position information of the UAV 1 to the server 2 via the radio communication unit 13 together with the aircraft ID of the UAV 1.

Moreover, the control unit 15 executes various controls of the UAV 1 according to a control program stored in, for example, the ROM or the non-volatile memory. The various controls include take-off control, flight control, landing control, and article arrangement control. In the flight control and the landing control, the position information acquired from the positioning unit 12, the image data acquired from the imaging unit 14, detection information acquired from various sensors, the position information on the arrangement place of the article, and pre-registered flight plan information (for example, including a planned route) is used to control the number of rotations of the rotor and the position, posture, and traveling direction of the UAV 1. Herein, the position information of the arrangement place of the article is acquired from the server 2, for example. Moreover, the position information of the arrangement place of the article is represented by, for example, the latitude and longitude of a point in the region that defines the arrangement place. The control unit 15 can cause the UAV 1 to fly to the arrangement place according to the position information on the arrangement place of the article. Moreover, autonomous flight of the UAV 1 is not limited to autonomous flight by the control unit 15 provided in the UAV 1 performing flight control. For the autonomous flight of the UAV 1, for example, the entire transport system S performs autonomous flight by performing flight control.

Incidentally, the position information of the arrangement place of the article may be acquired from a GCS (Ground Control Station) that manages the UAV 1 and can be remotely operated from the ground. In this case, the GCS acquires the position information of the arrangement place of the article from the server 2. For example, the GCS may be installed in a control terminal that can be connected to the communication network NW as an application, or may be systemized by a server or the like. The control unit 15 can also perform flight control according to an instruction signal from a control terminal operated by an operator. On the other hand, in the article arrangement control, the article held in the article holding mechanism is controlled to be separated (released) at the arrangement place where the article is arranged. By this configuration, the transported article is arranged at the arrangement place. The article arrangement control may be performed after the UAV 1 has landed at the article arrangement place, or may be performed while the UAV 1 is hovering over the arrangement place. In the article arrangement control performed while the UAV 1 is hovering, the article is lowered using a reel, a winch, or the like provided in the UAV 1. When the article reaches the ground or reaches a height of several meters from the ground, the article is separated. Incidentally, when one or more UAVs 1 transports a plurality of articles, the UAV 1 may repeatedly transport each article one by one, or the UAV 1 may transport the plurality of articles at once to arrange the articles.

[1-2. Outline of Configuration and Function of Server 2]

Figure 3:
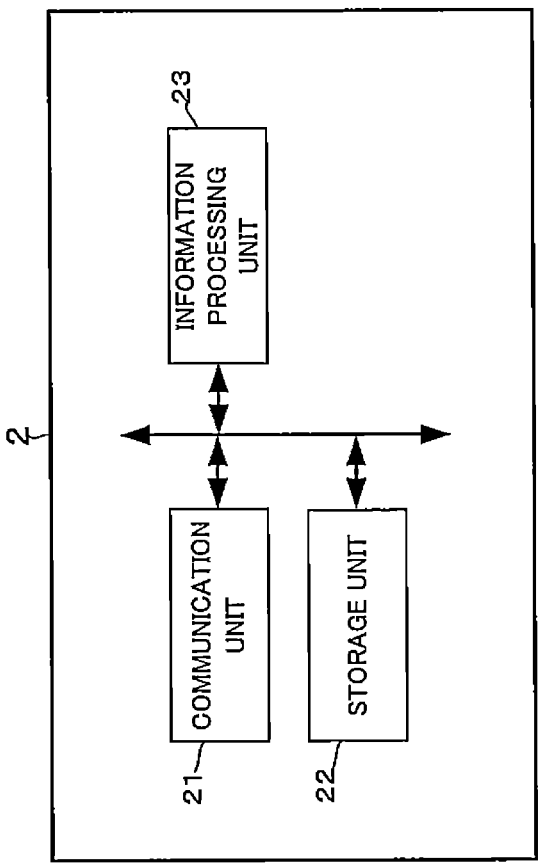
FIG. 3 is a diagram illustrating a schematic configuration example of a server 2.
Figure 4:
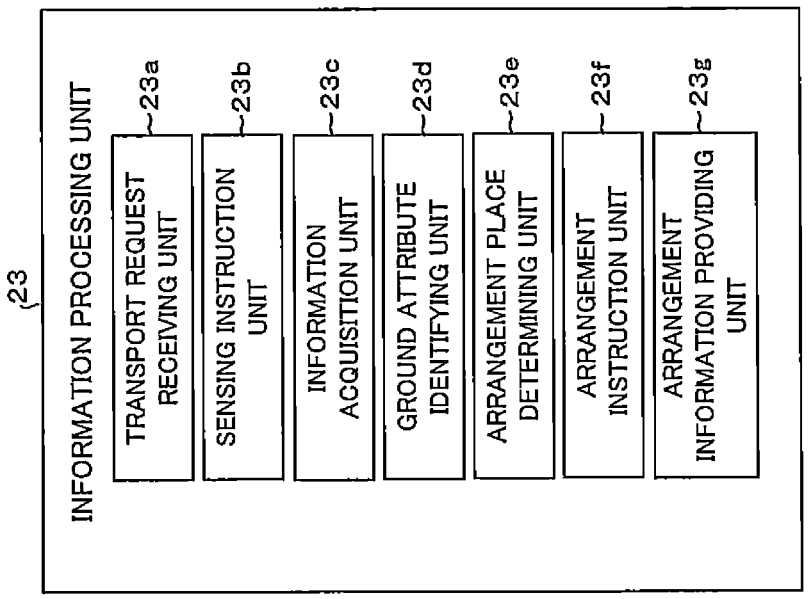
FIG. 4 is a diagram illustrating an example of functional blocks in a information processing unit 23.

Next, the outline of the configuration and function of the server 2 will be described with reference to FIGS. 3 and 4. FIG. 3 is a diagram illustrating a schematic configuration example of the server 2. As illustrated in FIG. 3, the server 2 includes a communication unit 21, a storage unit 22, an information processing unit 23, and the like. The communication unit 21 controls communication performed through the communication network NW. The storage unit 22 includes, for example, a hard disk drive and the like. In the storage unit 22, management information of article is distinguished and stored for each article. The management information of the article includes, for example, the article ID of the article, the type of article, the weight of the article, the size of the article, the priority of the article, the information on the transport destination area of the article, the aircraft ID of the UAV 1 that transports the article, the position information of the arrangement place of the article (that is, the arrangement place determined on the basis of the attribute of the ground), the information of the recipient of the article, and the like.

Herein, the article ID is identification information for identifying the article. The type of article may be identified from the article ID. Examples of types of article include clothes, medicines, books, food, drinks, daily necessities, first aid products (including bandages), electrical appliances, and the like. The type of article may be composed of a plurality of layers. For example, a soft drink, a carbonated drink, an alcoholic drink, or the like is set as the lower hierarchy type of the drink. Moreover, the material of a container of the article (for example, paper, can, bottle, etc.) may be set as the type of an upper hierarchy or a lower hierarchy of the article. Moreover, for example, in a case where a plurality of articles is packed into one and become an article identified by one article ID, a plurality of types (for example, food and drink) may be set for the article. Incidentally, the above-mentioned type may be used as basic information of the article, and in addition to this, accompanying information of the article may be incorporated as part of the type of article. The accompanying information of the article is, for example, information indicating the nature of the article and the like, and may be designated by the transport requester (for example, a shipper) or the recipient of the article. According to this configuration, it is possible to arrange the article in a more appropriate arrangement place according to the intention of the transport requester or the recipient of the article. Examples of accompanying information include a fragile item, weakness against heat, weakness against wetting, no use on the top and bottom (weakness to turn the article upside down), and the like.

The priority order of the article depends on, for example, an arrangement priority in a case where there is a plurality of articles to be arranged. For example, in a case where the number of articles that can be arranged on the ground having the appropriate attribute described above is limited, the article of a higher priority type is preferentially arranged on the ground. The priority of the article is set higher for an article of a type (for example, a drink) that is used more frequently in the transport destination area, for example. Moreover, the priority of the article may be set higher for an article of a higher importance type (for example, medicine) that is used immediately in the transport destination area, for example. Whether the importance is high or not can vary depending on what is required in the field (that is, the transport destination area of the article). Moreover, the priority of the article may be set higher for an article of a type with a larger planned arrangement number in the transport destination area, for example.

The information on the transport destination area of the article includes, for example, the name of the transport destination area, the position information, and the like. The information on the recipient of the article includes, for example, user ID, name, telephone number, e-mail address, and the like of the recipient of the article. The recipient of the article may be the transport requester of the article, or a person other than the recipient of the article may be the transport requester of the article. Incidentally, in a case where there are plans to arrange a plurality of articles in the transport destination area, the storage unit 22 may store planned arrangement number information indicating the planned arrangement number of articles. In this case, the planned arrangement number information may be stored separately for each type of article. Moreover, the storage unit 22 may store map data of an area where the UAV 1 can fly. The map data includes the position information (for example, latitude and longitude) of each point in an area where the UAV 1 can fly.

The information processing unit 23 includes a CPU, a ROM, a RAM, a non-volatile memory that are processors, and the like. FIG. 4 is a diagram illustrating an example of functional blocks in the information processing unit 23. The information processing unit 23 functions as, as illustrated in FIG. 4, a transport request receiving unit 23a, a sensing instruction unit 23b, an information acquisition unit 23c, a ground attribute identifying unit 23d, an arrangement place determining unit 23e, an arrangement instruction unit 23f, and an arrangement information providing unit 23g, for example, according to a program stored in the ROM or the non-volatile memory. Incidentally, the ground attribute identifying unit 23d is an example of a identifying unit. The arrangement place determining unit 23e is an example of a determining unit.

The transport request receiving unit 23a receives, for example, the transport request for the article which is transmitted from the user terminal 3 used by the transport requester of the article. The transport request of the article is a message indicating a request to transport the article into the transport destination area. The transportation request of the article includes, for example, the article ID of the article designated by the transport requester at the user terminal 3, the information on the transport destination area, the information on the recipient, and the like. The transportation request of the article may include, for example, priority information indicating the priority (that is, the priority of the article) specified by the transport requester at the user terminal 3. Moreover, the transportation request for the article may include, for example, weight information indicating the weight (that is, the weight of the article) designated by the transport requester at the user terminal 3. Moreover, the transportation request for the article may include, for example, accompanying information (that is, accompanying information on the article) designated by the transport requester at the user terminal 3. Incidentally, in a case where the transport requester and the recipient of the article are different, the accompanying information of the article may be received from the user terminal 3 of the recipient by being designated by the recipient of the article.

The sensing instruction unit 23b transmits a ground sensing instruction to the UAV 1 via the communication unit 21 in a case where a pre-selected UAV 1 arrives at the transport destination area. The ground sensing instruction is an instruction message for causing the UAV 1 to perform ground sensing in the transport destination area. The UAV 1 that is the transmission destination of the ground sensing instruction may be the UAV 1 for transportation or the UAV 1 for sensing.

The information acquisition unit 23c acquires the sensing data obtained by the sensing performed by the UAV 1 in response to the ground sensing instruction from the UAV 1 together with the aircraft ID of the UAV 1. Moreover, the information acquisition unit 23c may acquire type information indicating the type of article on the basis of the article ID included in the transport request of the article. At this time, in a case where the accompanying information of the article is included in the transportation request of the article, the information acquisition unit 23c acquires the type information including the accompanying information as a part of the type of article. Moreover, in a case where the weight information indicating the weight of the article is included in the transportation request of the article, the information acquisition unit 23c acquires the weight information. Moreover, in a case where the priority information indicating the priority of the article is included in the transportation request of the article, the information acquisition unit 23c acquires the priority information. Incidentally, in a case where there are plans to arrange a plurality of articles in the transport destination area, the information acquisition unit 23c may acquire the planned arrangement number information indicating the planned arrangement number of articles from the storage unit 22.

The ground attribute identifying unit 23d identifies the attribute of the ground in the transport destination area on the basis of the sensing data acquired by the information acquisition unit 23c. For example, the ground attribute identifying unit 23d generates mapping image data of the ground in the transport destination area on the basis of the sensing data. The mapping image data is mainly generated on the basis of the image data captured by the camera. The mapping image data corresponds to the transport destination area, and each point (pixel) of the mapping image data is associated with, for example, color (RGB value), latitude, and latitude. Moreover, in a case where a 3D camera is used for ground sensing, each point of the mapping image data is associated with the height of each point in addition to the color, latitude, and latitude. The height of each point may be calculated on the basis of the sensing data obtained by sensing with the LiDAR. Moreover, in a case where a camera, an infrared sensor, or the like is used for ground sensing, each point of the mapping image data is associated with a radiation temperature of each point in addition to the color, latitude, and latitude (and the height may be associated). Moreover, in a case where a camera, a photoelectric sensor, or the like is used for ground sensing, each point of the mapping image data is associated with a light reflectance of each point in addition to the color, latitude, and latitude (and the height may be associated).

Then, the ground attribute identifying unit 23d identifies, for example, by analyzing the generated mapping image data and classifying the ground in the transport destination area into one of a plurality of attributes. For example, the type and hardness of the ground can be identified by at least one of the ground color (including color change) represented by the mapping image data, the reflectance of light from the ground, the radiation temperature from the ground, and the like. Moreover, the shape of the ground (for example, unevenness and inclination) can be identified by a change in height of the ground represented by the mapping image data. Moreover, the state of the ground (for example, a puddle) can be identified by the reflectance of light from the ground and the radiation temperature represented by the mapping image data. Incidentally, the ground attribute identifying unit 23d may use a learned model which is learned from learning data (teacher data) with the parameters (for example, color, height, temperature, reflectance, etc.) of each point in the mapping image data obtained in the past as explanatory variables and the ground attributes as objective variables. In this case, the ground attribute identifying unit 23d can estimate the attribute of the ground by obtaining the output value from the learned model by inputting the parameter of each point in the mapping image data generated this time to the learned model. According to this configuration, identification precision of the attribute of the ground can be improved. FIG. 5 is a conceptual diagram illustrating the result of identifying the attributes of the ground in the transport destination area. In the example of FIG. 5, the ground in a transport destination area Ar includes concrete grounds Gr1 and Gr2, a soil ground Gr3, and a lawn ground Gr4. In particular, the concrete ground can be classified into a plurality of sections Gr1 and Gr2. Incidentally, the transport destination area may include a ground of which attributes cannot be identified as illustrated in FIG. 5.

The arrangement place determining unit 23e determines all or part of the region among the grounds having an appropriate attribute for arranging the article to be arranged (that is, one or more articles to be transported into the transport destination area) as the arrangement place of the article on the basis of the attribute of the ground which is identified by the ground attribute identifying unit 23d. Incidentally, the area of the region determined as the arrangement place of the article may be equal to or greater than the area of the ground contact surface of the article to be arranged. Moreover, as described above, whether the attribute is appropriate may change depending on the type of article. Therefore, the arrangement place determining unit 23e may determine all or part of the region in the ground having an appropriate attribute according to the type of article to be arranged as the arrangement place of the article on the basis of the attribute of the ground and the type information acquired by the information acquisition unit 23c. According to this configuration, it is possible to arrange the article at a more appropriate arrangement place according to the type of article. At this time, the arrangement place determining unit 23e may use a table (hereinafter, referred to as "arrangement propriety table" or "arrangement appropriateness table") that indicates a relation between the type of article and the attribute of the ground by propriety (binary value) or appropriateness (a value of 3 or more) of arrangement of the article in order to determine all or part of the region in the ground having an appropriate attribute according to the type of article as the arrangement place of the article. According to this configuration, the arrangement place of the article can be determined more rapidly. Incidentally, the arrangement propriety table or the arrangement appropriateness table is stored in the storage unit 22 in advance.

FIG. 6 is a diagram illustrating an example of the arrangement propriety table, and FIG. 7 is a diagram illustrating an example of the arrangement appropriateness table. In the examples of FIGS. 6 and 7, a plurality of types of patterns (No. 1 to No. 13 . . . ) is registered, and each type is defined by only basic information or by the basic information and the accompanying information. Incidentally, in the example of FIGS. 6 and 7, it is possible to cope with a case where the attribute of the sensed ground is expressed in a plurality of dimensions. In FIG. 6, the propriety for each of the plurality of attributes is associated with each of the plurality of types of patterns (No. 1 to No. 13 . . . ). According to the arrangement propriety table illustrated in FIG. 6, for example, in a case where the type of article to be arranged corresponds to "clothes" (No. 1), the ground with a puddle (attribute: puddle) and the wet ground become "UNFIT". This is taken into account that the clothes get wet. In this case, the arrangement place determining unit 23e selects the ground having an appropriate attribute according to the type "clothes" of the article except the ground with a puddle and the wet ground, and determines all or part of the region among the selected ground as the arrangement place of the article. Herein, in a case where the sensed ground includes, for example, both a concrete ground without a puddle and a soil ground without a puddle, one of the grounds is selected at random, for example.

Moreover, according to the arrangement propriety table illustrated in FIG. 6, for example, in a case where the type of article to be arranged corresponds to "book" (No. 4), the lawn ground becomes "UNFIT" in addition to the ground with a puddle and the wet ground. This is because it is difficult to determine whether the lawn is wet, and there is a possibility that the lawn may get wet with dew or the like. Incidentally, in a case where there is a possibility that the arranged article may be left for a long time, the lawn ground is not selected as a ground having an appropriate attribute (that is, the ground is excluded from the arrangement target of the article). Whether the article may be left for a long time may be determined on the basis of information from the transport requester or the recipient, for example. Moreover, according to the arrangement propriety table illustrated in FIG. 6, for example, in a case where the type of article to be arranged corresponds to "Food & This side up" (No. 8), a certain irregular ground and an inclined ground are "UNFIT" in addition to the ground with a puddle. However, it may be configured such that "UNFIT" is determined only on a ground inclined equal to or more than a threshold (for example, 20 degrees) with respect to a ground with an inclination. In other words, in this case, the arrangement place determining unit 23e determines whether the ground is inclined equal to or more than a predetermined threshold on the basis of the inclination of the ground which is identified by the ground attribute identifying unit 23d, and does not select a ground inclined equal to or more than the threshold as a ground having an appropriate attribute (that is, the ground is not a target for the article to be arranged). This is to prevent the UAV 1 from becoming unstable when landing. However, in the case where landing is not required for separation of the article (for example, in a case where a reel, a winch or the like provided in the UAV 1 is provided), the threshold of the angle may be increased as compared with a case where landing is required. For example, the threshold may be set to an angle at which the article does not slip and move.

On the other hand, in FIG. 7, the appropriateness for each of the plurality of attributes is associated with each of the plurality of types of patterns (No. 1 to No. 13 . . . ). In this example, the appropriateness is represented by A, B, and C. The appropriateness represented by A is most suitable for arrangement, whereas the appropriateness represented by C is least suitable and not the most appropriate for arrangement. According to the arrangement appropriateness table illustrated in FIG. 7, for example, in a case where the type of article to be arranged corresponds to "clothes" (No. 1), the appropriateness "C". In this case, the arrangement place determining unit 23e selects the ground having an appropriate attribute according to the type "clothes" of the article except the ground with a puddle and the wet ground, and determines all or part of the region among the selected ground as the arrangement place of the article. Herein, in a case where the sensed ground includes, for example, both a concrete ground without a puddle and a soil ground without a puddle, the appropriateness "A" of the concrete ground is higher than the appropriateness "B" of the soil ground, so that a concrete ground having no puddle is selected. Incidentally, in a case where the type of article to be arranged is "Food & This side up & Fragile", "Food & Fragile" (No. 7) and "Food & This side up" (No. 8) are appropriate in the arrangement appropriateness table illustrated in FIG. 7, and the ground that has the appropriate attribute according to the type under OR condition of two types will be selected.

Herein, since the article arranged at the arrangement place in the transport destination area is received by a person who needs the article (for example, a recipient), it is desirable to arrange the article in an arrangement place as close as possible to a point (an example of the specific point) where the person who needs the article waits. Therefore, the arrangement place determining unit 23e may determine part of the region (for example, in the shortest distance from the point) close to the point where the person who needs the article waits as the arrangement place of the article among the grounds (for example, the grounds having an appropriate attribute according to the type of article) having an appropriate attribute for arranging the article to be arranged. According to configuration, the time for a person who needs the article to move from the specific point to the arrangement place where the article is arranged can be shortened, and the article can be provided to the person more quickly. For example, in FIG. 5, if the ground having an appropriate attribute for arranging the article is the soil ground Gr3, the region Gr31 closest to the specific point Px in the soil ground Gr3 is determined as the arrangement place of the article. Incidentally, for example, the specific point Px is identified by transmitting the position information detected by the GPS function of the user terminal 3 used by the person who needs the article to the server 2. Alternatively, the specific point Px may be identified by detecting a person or a building (waiting place) on the basis of the sensing data acquired by the information acquisition unit 23c. Incidentally, the specific point may be, for example, a point where a person who checks the location without receiving the article waits, or a point where an unmanned ground vehicle that collects the arranged article is stopped. Instead of part of the region close to such a specific point (or in addition to being close to the specific point), part of the region that is easy for people to enter from the specific point (that is, easy to enter because of few obstacles) may be determined as the arrangement place.

Further, the weight of the article may be taken into consideration when the article to be arranged is arranged at the arrangement place close to the specific point. For example, the arrangement place determining unit 23e is part of the region closer to the specific point as the weight of the article increases may be determined as the arrangement place of the article among the grounds having an appropriate attribute for arranging the article to be arranged on the basis of the attribute of the ground and the weight information acquired by the information acquisition unit 23c. According to this configuration, it is possible to reduce a burden of the person who needs the article and carries the article from the arrangement place to the specific point. Moreover, when the article to be arranged is arranged at the arrangement place close to the specific point, the priority of the article may be taken into consideration. For example, the arrangement place determining unit 23e is part of the region closer to the specific point as the priority of the article increases may be determined as the arrangement place of the article among the grounds having an appropriate attribute for arranging the article to be arranged on the basis of the attribute of the ground and the priority information acquired by the information acquisition unit 23c. According to this configuration, the article having a high priority (for example, an article that is frequently used or an article that is immediately used) can be provided more quickly to a person who needs the article. Alternatively, when the article to be arranged is arranged at the arrangement place close to the specific point, the priority of the article may be considered together with the weight of the article. For example, the arrangement place determining unit 23e is part of the region closer to the specific point as the weight increases and the priority of the article increases may be determined as the arrangement place of the article among the grounds having an appropriate attribute for arranging the article to be arranged on the basis of the attribute of the ground, and the weight information and the priority information acquired by the information acquisition unit 23c. Incidentally, according to this configuration, even if it is a heavy article, the article with a low priority can be arranged far from the specific point.

By the way, in a case where there are plans to arrange the plurality of articles (for example, a plurality of articles of the same type or a plurality of articles in which a plurality of types are mixed) in the transport destination area, for example, one UAV 1 repeatedly transports the plurality of articles, or each of the plurality of UAVs 1 is needed to transport each (single transportation, or repeated transportation). In this case, it is desirable not only to use the above-described arrangement propriety table or arrangement appropriateness table, but also to perform an optimization process for making an arrangement plan for the plurality of articles. For example, the arrangement place determining unit 23e is the arrangement place of each article is determined by performing the optimization process for optimizing the arrangement of the plurality of articles to be arranged on the basis of the attribute of the ground to be appropriate to the arrangement criterion (that is, the arrangement criterion according to the arrangement plan for the plurality of articles) for arranging the plurality of articles. According to this configuration, it is possible to arrange the plurality of articles to the arrangement places more appropriately according to the arrangement criterion for the plurality of articles. Herein, the optimization process is a process for making an arrangement plan that can be determined to be most appropriate in one or some specific views, and is not necessarily the most appropriate arrangement plan in other views. Incidentally, in order to perform such optimization process, it is desirable that the arrangement place determining unit 23e acquires information such as the type, priority, planned arrangement number, and size of the article to be arranged before determining the arrangement place. Examples of the arrangement criterion include the following examples (i) to (v).

(i) Criterion for Arranging More Articles on the Ground with Appropriate Attributes In the optimization process in this case, the arrangement of the plurality of articles is optimized so that more articles are arranged on the ground having an appropriate attribute. In other words, optimization is performed from the viewpoint of arranging as many articles as possible. For example, in a case where a first type (for example, "FIT" in the arrangement propriety table) of article (or a plurality of articles) which is appropriate to arranged to a concrete ground and a lawn ground and a second type (a different type from the first type) of article (or a plurality of articles) which is appropriate to be arranged only to a lawn ground are planned to be transported, and the area of the lawn ground is not sufficient for the second type of article if the first type of article is arranged, the second type of article is arranged in the lawn ground, and optimization is performed to arrange the first type of article in the concrete ground.

(ii) Criterion for Arranging Higher Priority Article on the Ground with Appropriate Attributes In the optimization process in this case, the arrangement of the plurality of articles is optimized so that the article with higher priority is arranged on the ground having an appropriate attribute. In other words, in a case where it is difficult to arrange all the articles on the ground since the range of the ground having an appropriate attribute is narrow, optimization is performed from the viewpoint of arranging the article having a priority as high as possible. For example, in a case where the first type of article and the second type of article that are most appropriate for arrangement on the concrete ground (for example, "A" in the arrangement appropriateness table) are planned to be transported, and the area of the concrete ground is not sufficient for any one of the first type of article and the second type of article if the other article is arranged (that is, it is difficult that all the articles are arranged in the ground having an appropriate attribute), optimization is performed such that the first type of article having a priority higher than that of the second type of article is arranged on the concrete ground, and the second type of article is arranged on the ground other than the concrete ground. Incidentally, the priority of each article may be used for weighting of the optimization process.

(iii) Criterion for Arranging a Plurality of Articles of the Same Type on the Ground Having Appropriate Attributes while being Densely Packed In the optimization process in this case, the arrangement of the plurality of articles is optimized so that the plurality of articles of the same type are densely arranged on the ground having an appropriate attribute. In other words, the optimization process is performed from the viewpoint of arranging the plurality of articles of the same type as close together as possible in consideration of ease of understanding when a person who needs the articles collects the articles. For example, optimization may be performed such that various types of articles are arranged as much as possible on the basis of evaluation values (for example, dispersion or total distance to the gravity center, etc.) obtained by evaluating the degree of grouping or variation of the same type of articles. FIG. 8 is a conceptual diagram illustrating a state in which the plurality of articles are arranged so as to meet a criterion for arranging the plurality of articles of the same type densely on the ground having appropriate attributes. In the example of FIG. 8, the plurality of articles whose type is clothes are arranged on the concrete ground Gr5, a plurality of articles whose type is a can are arranged on the lawn ground Gr6, and a plurality of articles whose type is a bottle are arranged in the sand ground Gr7. A plurality of articles of type book are arranged on the soil ground Gr8.

(iv) Criterion for Arranging the Plurality of Articles of the First Type and the Plurality of Articles of the Second Type on the Ground Having Appropriate Attributes In the optimization process in this case, the plurality of articles of the first type are densely packed, the plurality of articles of the second type are gathered, and the plurality of articles are optimized to be arranged in the ground having an appropriate attribute while keeping a distance between one point in the range where the plurality of articles of the first type are densely packed and one point in the range where the plurality of articles of the second type are densely packed. In other words, in a case where the plurality of articles are added and arranged sequentially later, the optimization process is performed from the viewpoint of easily expanding the region where the plurality of articles are arranged as close as possible for each type. FIG. 9 is a conceptual diagram illustrating a state in which the plurality of articles are arranged so as to meet a criterion for arranging the plurality of articles of the first type and the plurality of articles of the second type separately on the ground having an appropriate attribute. In the example of FIG. 9, in the soil ground Gr10, the distance between the gravity center of a range H1 where the plurality of articles of type clothes is densely packed and the gravity center of a range H2 where the plurality of articles of type books are densely packed is a m (predetermined distance). Herein, for example, the predetermined distance may be a distance that increases as the planned arrangement number of articles is increased.

(v) Criterion for Arranging the Articles in a Wide Range of the Ground as the Planned Arrangement Number of Articles is Large Among the Grounds that have Appropriate Attributes and are Divided into a Plurality of Sections In the optimization process in this case, the plurality of articles are optimized to be arranged in a wide range of the ground as the planned arrangement number indicated by the planned arrangement number information is large among the grounds having an appropriate attribute and divided into a plurality of sections. In other words, optimization is performed from the viewpoint of arranging the plurality of articles as much as possible on the ground having a size corresponding to the planned arrangement number. For example, in the example of FIG. 5, in a case where the grounds having an appropriate attribute are the concrete grounds Gr1 and Gr2 and the soil ground Gr3, and the planned arrangement number of articles is equal to or more than a threshold, the concrete ground Gr1 having the widest range is selected. On the other hand, in a case where the planned arrangement number of articles is less than the threshold, the soil ground Gr3 closest to the specific point Px may be selected from the concrete grounds Gr1 and Gr2 and the soil ground Gr3. Incidentally, the (v) criterion may be a criterion for arranging the articles in a wide range of the ground as the planned arrangement number of articles of each type is large among the grounds that have appropriate attributes and are divided into a plurality of sections according to the type of article. In the optimization process in this case, the plurality of articles are optimized to be arranged for each type in a wide range of the ground as the planned arrangement number of each type of the articles is large among the grounds having an appropriate attribute and divided into a plurality of sections according to the type of article.

In a case where the arrangement place of the article is determined by the arrangement place determining unit 23e, the arrangement instruction unit 23f transmits an article arrangement instruction to the UAV 1 that has transported the article to the transport destination area via the communication unit 21. The article arrangement instruction is an instruction message for arranging an article at the determined arrangement place.

The arrangement information providing unit 23g notifies the transport requester or the recipient of the article of the arrangement information of the article arranged at the arrangement place determined by the arrangement place determining unit 23e, for example. According to this configuration, it is possible to accurately convey the arrangement place of the article to the transport requester or the recipient of the article. For example, the arrangement information providing unit 23g sends an e-mail (or short e-mail) describing the arrangement information of the article by transmitting the e-mail to an e-mail address (or telephone number) of the transport requester or the recipient of the article. Alternatively, the arrangement information providing unit 23g may transmit a message (for example, an HTTP message) describing the arrangement information of the article to the user terminal 3 in response to a request from the user terminal 3.

Herein, the arrangement information of the article includes the position information of the arrangement place of the article actually arranged among the articles whose arrangement place is determined. The position information of the arrangement place may be position information indicating the position of the arrangement place determined by the arrangement place determining unit 23e (for example, acquired from the mapping image data), or position information indicating the position detected by the positioning unit 12 when the UAV 1 actually arranges the article. Incidentally, the arrangement information of the article may include, for example, the type and name of the article, an administrative division name of the arrangement place of the article, and the like. Moreover, the arrangement information of the article may be provided to the user terminal 3 as an arrangement map in which, for example, the types and number of articles that have been arranged at the present time point are illustrated on the map. Alternatively, the arrangement information of the article may be displayed on the user terminal 3 using an augmented reality technology. Alternatively, when the recipient of the article inputs a desired article type in the user terminal 3, navigation to the article may be performed on the basis of the arrangement information of the article.

[2. Operation of Transport System S]

Next, an operation example of the transport system S according to this embodiment will be described with reference to FIG. 10. Incidentally, the following operation example is an operation after the UAV 1 that transports the article requested to be transported from the user terminal 3 arrives at the transport destination area. FIG. 10 is a sequence diagram illustrating an example of the operation of the transport system S after the UAV 1 arrives at the transport destination area.

In FIG. 10, when the UAV 1 that transports the article arrives at the transport destination area (Step S1), an arrival notification is sent to the server 2 (Step S2). The determination of arrival at the transport destination area is performed, for example, by determining whether the current position of the UAV 1 has entered the transport destination area on the basis of the position information of the UAV 1 and the position information of the transport destination area. Incidentally, the position information of the transport destination area is indicated, for example, in the planned route in the flight plan information. Next, when the server 2 receives the arrival notification from the UAV 1, the server 2 transmits the ground sensing instruction to the UAV 1 (Step S3). Incidentally, the ground sensing instruction may be sent to the sensing UAV 1 that does not transport the article.

Next, when receiving the ground sensing instruction from the server 2, the UAV 1 performs sensing the ground in the transport destination area (Step S4). Incidentally, the sensing of the ground may be performed while moving over the transport destination area, or may be performed while hovering. Then, the UAV 1 transmits the sensing data obtained by sensing the ground to server 2 together with the aircraft ID of the UAV 1 (Step S5).

Next, when receiving the sensing data from the UAV 1, the server 2 identifies the attribute of the ground in the transport destination area on the basis of the sensing data as described above (Step S6). Next, on the basis of the attributes of the ground identified in Step S6, the server 2 uses, for example, the arrangement propriety table or the arrangement appropriateness table as described above, and all or part of the region in the ground having an appropriate attribute is determined as the arrangement place of the article (Step S7). Next, the server 2 transmits the article arrangement instruction to the UAV 1 together with the position information of the arrangement place determined in Step S7 (Step S8).

Next, when receiving the article arrangement instruction from the server 2, the UAV 1 moves to the arrangement place according to the position information of the arrangement place and performs article arrangement control (Step S9). By this configuration, the transported article is arranged at the arrangement place. Then, when the arrangement of the article is completed, the UAV 1 transmits an arrangement completion notification to the server 2 (Step S10). This arrangement completion notification is arrangement completion information indicating that the arrangement of the transported article has been completed.

Incidentally, the UAV 1 may perform sensing (hereinafter, referred to as "arrangement sensing") for at least one of the article and the arrangement place (which may include the surrounding area) when placing the article at the arrangement place. In the arrangement sensing, for example, an impact sensor measures an impact or vibrations applied to the article when the article is arranged. Arrangement sensing data obtained by the arrangement sensing is transmitted from the UAV 1 to the server 2. The arrangement sensing data is an example of information obtained from the arrangement result of the article.

Next, when the server 2 receives the arrangement completion notification from the UAV 1, the server 2 transmits the arrangement information of the article arranged at the arrangement place to the user terminal 3 (Step S11). By this configuration, for example, the recipient who uses the user terminal 3 is notified of the arrangement information. The recipient moves to the arrangement place on the basis of the arrangement information and receives the article.

Incidentally, in a case where the arrangement sensing data is received from the UAV 1, the server 2 updates the arrangement propriety in the arrangement propriety table or the arrangement appropriateness in the arrangement appropriateness table on the basis of the arrangement sensing data.

For example, in a case where the value of impact or vibration indicated in the arrangement sensing data is equal to or greater than the threshold, the server 2 sets "FIT" associated with the attribute of the ground including the determined arrangement place to "UNFIT" (changes "FIT" to "UNFIT"), or changes the appropriateness to be lowered (for example, from "A" to "B"). Moreover, for example, it may be configured such that a recipient who has received an arranged article can report the state of the article (for example, whether there is damage or the degree of damage) and the like from the user terminal 3.

In this case, the server 2 updates the propriety of arrangement in the arrangement propriety table or the appropriateness of arrangement in the arrangement appropriateness table on the basis of the information (an example of the information obtained from the arrangement result of the article) indicating the state of the article from the user terminal 3. According to this configuration, it is possible to optimize the arrangement propriety table or the arrangement appropriateness table. For example, in a case where the information indicating the state of the article indicates that there is damage (or when the degree of damage is large), the server 2 sets "FIT" associated with the attribute of the ground including the determined arrangement place to "UNFIT", or changes the appropriateness to be lowered (for example, from "A" to "B").

As described above, according to the above-described embodiment, the transport system S identifies the attribute of the ground on the basis of the sensing data obtained by sensing the ground in the transport destination area which is performed in flight by the UAV 1 which transports the article or a UAV 1 other than the UAV 1, and determines all or part of the region in the ground as the arrangement place of the article on the basis of the identified attribute. Therefore, it is possible to arrange the article to be transported by the UAV 1 at a more appropriate arrangement place. Moreover, since the transport system S notifies the delivery requester or the recipient of the article transported by the UAV 1 of the arrangement information of the article, it is possible to accurately convey the arrangement place of the article to such a person. For example, the recipient of the article can easily know where a desired article is arranged and can easily find the article.

Incidentally, in the above operation example, an example in which the propriety of arrangement in the arrangement propriety table or the appropriateness of arrangement in the arrangement appropriateness table is updated on the basis of the information obtained from the arrangement result of the article is described. It may be configured such that the propriety or appropriateness of arrangement is added to the position information of the arrangement place (or the surrounding area) in the map data of the transport destination area on the basis of the information obtained from the arrangement result of the article. For example, in a case where the value of impact or vibration indicated in the arrangement sensing data is equal to or greater than a threshold, the arrangement failure or the lowest appropriateness is added to the position information of the arrangement place (or the surrounding area). Moreover, the UAV 1 may be provided with a wind speed sensor for the arrangement sensing. In the arrangement sensing using a wind speed sensor, the wind speed of a portion close to the arrangement place (for example, a portion within several meters from the ground) is measured. Then, in a case where the value of the wind speed indicated in the arrangement sensing data is equal to or greater than a threshold, the arrangement failure or the lowest appropriateness is added to the position information of the arrangement place (or the surrounding area). Moreover, for example, in a case where the information indicating the state of the article from the user terminal 3 indicates that there is damage (or when the degree of damage is large), the arrangement failure or the least appropriateness is added to the position information of the arrangement place (or the surrounding area). In a case where the article to be arranged is transported again to the transport destination area after the arrangement failure or the like is added as described above, the server 2 selects a plurality of arrangement place candidates for the article on the basis of the attribute of the ground. Then, among the plurality of selected arrangement place candidates, the arrangement place is determined by excluding the arrangement place candidates in which the arrangement failure or the lowest appropriateness in the map data is added to the position information. According to this configuration, the article to be transported by the UAV 1 can be arranged at a more appropriate arrangement place.

Moreover, the UAV 1 may be provided with a soil sensor for the arrangement sensing. The arrangement sensing using the soil sensor is performed with the UAV 1 landing on the arrangement place, and the hardness of the ground at the arrangement place is measured. Then, the learned model may be optimized on the basis of the relation between the actual hardness of the ground indicated in the arrangement sensing data and the parameter (for example, color) corresponding to the arrangement place in the mapping image data described above. According to this configuration, identification precision of the attribute of the ground can be improved.

Moreover, in the above operation example, it is assumed that all the articles are transported and arranged after the sensing is performed once and the arrangement place of the article is determined, but this embodiment is not limited to this case. For example, even after the arrangement place is determined once, the ground may be re-sensed from above the transport destination area before or after the UAV 1 transports and arranges the article and the like. In this case, the server 2 re-identifies the attribute of the ground on the basis of the sensing data obtained by re-sensing, and all or part of the region in the ground is re-determined as the arrangement place of the article on the basis of the attribute of the ground, so that the arrangement plan of the article is updated. According to this configuration, it is possible to arrange the article more appropriately. For example, in a case where the UAV 1 repeatedly transports a large number of articles from a distance, or in a case where the articles are repeatedly transported after a long time, the time has elapsed from the time point of the first sensing and the state, condition, and the like of the ground have changed. Even in this case, the articles to be subsequently transported by the UAV 1 can be more appropriately arranged. However, in a case where it is determined that the reliability of the sensing data and the identification precision of the attribute of the ground are degraded, the arrangement plan may not be updated. For example, when the image data is used for the attribute of the ground, only a dark image can be acquired in the night time zone, and the identification precision of the attribute of the ground may be degraded. In such a case, the arrangement of the article may be performed according to the arrangement place determined on the basis of the image data acquired in the daytime period, without updating the arrangement plan using the image data acquired in the nighttime period.

Moreover, for example, in a case where the UAV 1 repeatedly transports a large number of articles from a distance, or in a case where the articles are transported over time, it is assumed that the articles are changed by the recipient's hand or the articles are collected outside the transport destination area while the articles are being transported repeatedly. Therefore, after the transport requester or the recipient is notified of the arrangement information of the article and a predetermined time has elapsed, the UAV 1 may capture an image of the arranged article from above the transport destination area, and transmit information indicating the arrangement status of the photographed article to the server 2. In this case, the server 2 updates the arrangement information of the article by recognizing a difference from, for example, the arrangement situation indicated by an already sent notification of the arrangement information on the basis of the arrangement situation of the article photographed by the UAV 1. Incidentally, a well-known image recognition technique may be used to update the arrangement information of the article. Then, the server 2 notifies the transport requester or the recipient of the updated arrangement information. According to this configuration, the arrangement information provided to the transport requester or the recipient can be made more accurate and realistic. Moreover, for example, in the case of an emergency or the like, which type of article is lacking when the transport requester mainly transports and arranges articles such as water and medicines instead of the order base from the user (in other words, whether the demand is high) may be estimated, and the article to be transported may be selected. This selection may be performed automatically or may be performed by a staff on the side of the transport requester.

Moreover, in the above operation example, the server 2 is configured to identify the attribute of the ground, determine the arrangement place, and provide the arrangement information. However, the UAV 1 may identify the attribute of the ground and determine the arrangement place. Alternatively, the server 2 may identify the attribute of the ground, and the arrangement place and the arrangement information may be determined and provided by another computer which is included in the transport system S.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention.

REFERENCE SIGNS LIST

1 UAV
2 Server
11 Drive unit
12 Positioning unit
13 Radio communication unit
14 Imaging unit
Control unit
21 Communication unit
22 Storage unit
23 Information processing unit
23a Transport request receiving unit
23b Sensing instruction unit
23c Information acquisition unit
23d Ground attribute identifying unit
23e Arrangement place determining unit
23f Arrangement instruction unit
23g Arrangement information providing unit
S Transport system

The invention claimed is:

1. A determining method performed by a transport system including an unmanned aerial vehicle for transporting an article into a predetermined transport destination area, including:
   identifying an attribute of a ground on the basis of sensing data obtained by sensing the ground in the predetermined transport destination area which is performed in flight by the unmanned aerial vehicle that transports the article or another unmanned aerial vehicle that senses the ground;
   acquiring type information indicating a type of article;
   determining, on the basis of the attribute of the ground and the acquired type information, whether all or part of a region of the ground has an attribute having, among at least a first appropriateness level indicating that all or part of the region of the ground is fit for the type of article and a second appropriateness level indicating that all or part of the region of the ground is unfit for the type of article, the first appropriateness level for the type of the article;
   on the basis of determining that the all or the part of the region of the ground has an attribute having the first appropriateness level, determining the all or the part of the region of the ground as an arrangement place of the article;
   transmitting instruction information for arranging the article at the determined arrangement place to the unmanned aerial vehicle in flight by radio communication from an information processing device; and
   performing flight control of the unmanned aerial vehicle that transports the article according to the determined arrangement place on the basis of the instruction information.

2. The determining method according to claim 1, wherein the all or the part of the region of the ground having an attribute having the first appropriateness level for arranging the article is determined as the arrangement place of the article on the basis of the attribute of the ground.

3. The determining method according to claim 1, wherein the unmanned aerial vehicle senses the ground via a sensor, the sensor selected from a group consisting of a camera, an infrared sensor, a thermal sensor, an ultrasonic sensor, a photoelectric sensor, a laser sensor, and a LiDAR.

4. The determining method according to claim 3, further including:
   receiving accompanying information of the article from a terminal of a transport requester or a recipient of the article,
   wherein the type information includes the accompanying information, and
   wherein the type information including the accompanying information is acquired as a part of the type of the article.

5. The determining method according to claim 3, wherein a table indicating appropriateness levels of the article is used to determine the all or the part of the region of the ground having an attribute having the first appropriateness level.

6. The determining method according to claim 5, further including: updating the propriety or an appropriateness level of the arrangement of the article on the basis of information obtained from an arrangement result of the article.

7. The determining method according to claim 1, wherein the part of the region nearer a specific point of the ground having an attribute having the first appropriateness level than other regions is determined as the arrangement place of the article on the basis of the attribute of the ground.

8. The determining method according to claim 1, further including:
acquiring weight information indicating a weight of the article,
wherein the part of the region nearer a specific point than other regions as the weight of the article is increased, of the ground having an attribute having the first appropriateness level, is determined as the arrangement place of the article on the basis of the attribute of the ground and the acquired weight information.

9. The determining method according to claim 1, further including:
acquiring priority information indicating a priority of the article,
wherein the part of the region nearer a specific point than other regions as a priority of the article is increased, of the ground having an attribute having the first appropriateness level, is determined as the arrangement place of the article on the basis of the attribute of the ground and the acquired priority information.

10. The determining method according to claim 1, wherein a process for optimizing an arrangement of a plurality of articles to be transported into the predetermined transport destination area is performed in order to meet an arrangement criterion for the arrangement of the plurality of articles on the basis of the attribute of the ground so as to determine each arrangement place of the plurality of articles.

11. The determining method according to claim 10, wherein the arrangement criterion is a criterion for arranging the plurality of articles on the ground having an appropriate attribute.

12. The determining method according to claim 10, wherein the arrangement criterion is a criterion for arranging a higher priority article among the plurality of articles on the ground having an attribute having the first appropriateness level.

13. The determining method according to claim 10, wherein the arrangement criterion is a criterion for arranging the plurality of articles of the same type densely on the ground having an attribute having the first appropriateness level.

14. The determining method according to claim 10, wherein the arrangement criterion is a criterion for densely gathering a plurality of articles of a first type, densely gathering a plurality of articles of a second type different from those of the first type, and arranging each plurality of articles of a first type and of a second type on the ground having an attribute having the first appropriateness level while separating a predetermined distance or more than the predetermined distance between one point in a range where the plurality of articles of the first type are densely gathered and one point in a range where the plurality of articles of the second type are densely gathered.

15. The determining method according to claim 10, wherein the arrangement criterion is a criterion for arranging the plurality of articles in a wider range of ground when a planned arrangement number of the articles is larger than a threshold on the ground that has an attribute having the first appropriateness level and is divided into a plurality of sections; and
wherein the threshold is defined as an expected amount of articles.

16. The determining method according to claim 1, further including: notifying a transport requester or a recipient of the article of arrangement information of the article arranged at the determined arrangement place.

17. The determining method according to claim 16, wherein, after a predetermined time has elapsed since the arrangement information is sent to the transport requester or the recipient, the arrangement information which is updated on the basis of an arrangement status of the article captured from above the predetermined transport destination area by the unmanned aerial vehicle that transports the article into the predetermined transport destination area or the other unmanned aerial vehicle that senses the ground is sent to the transport requester or the recipient.

18. The determining method according to claim 1,
wherein after the arrangement place is determined, the attribute of the ground is re-identified on the basis of sensing data obtained by re-sensing the ground in the predetermined transport destination area, and
wherein the all or the part of the region of the ground is re-determined as the arrangement place of the article on the basis of the re-identified attribute of the ground.

19. The determining method according to claim 1, wherein the unmanned aerial vehicle that transports the article into the predetermined transport destination area performs sensing the ground in the predetermined transport destination area.

20. The determining method according to claim 1, wherein the attribute of the ground is identified, on the basis of the sensing data, by classifying the ground into at least one of concrete, soil, lawn and sand.

21. The determining method according to claim 1, wherein the attribute of the ground is identified, on the bases of the sensing data, by classifying the ground as including a puddle or a deposit.

22. A transport system including an unmanned aerial vehicle that transports an article into a predetermined transport destination area, comprising:
at least one memory configured to store program code; and
at least one processor configured to access the program code and operate as instructed by the program code, the program code including:
identifying code configured to cause at least one of the at least one processor to identify an attribute of a ground on the basis of sensing data obtained by sensing the ground in the predetermined transport destination area which is performed in flight by: the unmanned aerial vehicle that transports the article or another unmanned aerial vehicle that senses the ground;
acquiring code configured to cause at least one of the at least one processor to acquire type information indicating a type of article;
first determining code configured to cause at least one of the at least one processor to determine, on the basis of the attribute of the ground and the acquired information, whether all or part of a region of the ground has an attribute having, among at least a first appropriateness level indicating that all or part of the region of the ground is fit for the type of article and a second appropriateness level indicating that all or part of the region of the ground is unfit for the type of article, the first appropriateness level for the type of the article;
second determining code configured to cause at least one of the at least one processor to determine, on the basis of determining that the all or the part of the region of the ground has an attribute having the first appropriateness level, the all or the part of the region of the ground as an arrangement place of the article;

transmitting code configured to cause at least one of the at least one processor to transmit instruction information for arranging the article at the determined arrangement place to the unmanned aerial vehicle in flight by radio communication from an information processing device; and flight control code configured to cause at least one of the at least one processor to perform flight control of the unmanned aerial vehicle that transports the article according to the determined arrangement place on the basis of the instruction information.

23. An information processing device provided in a transport system including an unmanned aerial vehicle that transports an article into a predetermined transport destination area, comprising:

at least one memory configured to store program code; and at least one processor configured to access the program code and operate as instructed by the program code, the program code including:

identifying code configured to cause at least one of the at least one processor to identify an attribute of a ground on the basis of sensing data obtained by sensing the ground in the predetermined transport destination area which is performed in flight by: the unmanned aerial vehicle that transports the article or another unmanned aerial vehicle that senses the ground;

acquiring code configured to cause at least one of the at least one processor to acquire type information indicating a type of the article;

first determining code configured to cause at least one of the at least one processor to determine, on the basis of the attribute of the ground and the acquired type information, whether all or part of a region of the ground has an attribute having, among at least a first appropriateness level indicating that all or part of the region of the ground is fit for the type of article and a second appropriateness level indicating that all or part of the region of the ground is unfit for the type of article, the first appropriateness level for the type of the article;

second determining code configured to cause at least one of the at least one processor to determine, on the basis of determining that the all or the part of the region of the ground has an attribute having the first appropriateness level, the all or the part of the region of the ground as an arrangement place of the article;

transmitting code configured to cause at least one of the at least one processor to transmit instruction information for arranging the article at the determined arrangement place to the unmanned aerial vehicle in flight by radio communication; and flight control code configured to cause at least one of the at least one processor to perform flight control of the unmanned aerial vehicle that transports the article according to the determined arrangement place by transmitting the instruction information.

* * * * *